(12) United States Patent
Kawasaki et al.

(10) Patent No.: US 9,317,940 B2
(45) Date of Patent: Apr. 19, 2016

(54) CRUISING ZONE DIVISION LINE RECOGNITION APPARATUS

(71) Applicant: DENSO CORPORATION, Kariya, Aichi-pref (JP)

(72) Inventors: Naoki Kawasaki, Kariya (JP); Masayuki Imanishi, Okazaki (JP); Shunsuke Suzuki, Nukata-gun (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/397,014

(22) PCT Filed: Apr. 23, 2013

(86) PCT No.: PCT/JP2013/061923
§ 371 (c)(1),
(2) Date: Oct. 24, 2014

(87) PCT Pub. No.: WO2013/161817
PCT Pub. Date: Oct. 31, 2013

(65) Prior Publication Data
US 2015/0104063 A1    Apr. 16, 2015

(30) Foreign Application Priority Data

Apr. 26, 2012 (JP) ................................. 2012-101582

(51) Int. Cl.
*G06K 9/00* (2006.01)
*G06T 11/00* (2006.01)
(Continued)

(52) U.S. Cl.
CPC .......... *G06T 11/001* (2013.01); *G06K 9/00798* (2013.01); *G06T 11/60* (2013.01); *G08G 1/167* (2013.01)

(58) Field of Classification Search
CPC ... G06K 9/00798; G06T 11/001; G08G 1/167
USPC ........................................................ 382/103
See application file for complete search history.

(56) References Cited

U.S. PATENT DOCUMENTS

| | | |
|---|---|---|
| 2006/0210116 A1 | 9/2006 | Azuma |
| 2007/0107965 A1 | 5/2007 | Kakinami et al. |
| 2015/0055831 A1 | 2/2015 | Kawasaki et al. |

FOREIGN PATENT DOCUMENTS

| | | |
|---|---|---|
| JP | 2003178399 A | 6/2003 |
| JP | 2003323627 A | 11/2003 |

(Continued)

OTHER PUBLICATIONS

Office Action dated Jan. 26, 2016 in corresponding Japanese Application No. 2012-101582 with English translation.*

(Continued)

*Primary Examiner* — Gregory F Cunningham
(74) *Attorney, Agent, or Firm* — Harness, Dickey & Pierce, P.L.C.

(57) ABSTRACT

A cruising zone division line recognition apparatus has an image acquisition device that acquires an image including a road surface ahead of a vehicle, and an image recognition device. The image recognition device adds blurring to an area including the road surface in the acquired image and recognizes a cruising zone division line from the image to which blurring has been added. When blurring is added, a cruising zone division line that is an intermittent double line included in a captured image can be made unclear. Therefore, the recognized cruising zone division line can be prevented from becoming a discontinuous, disjointed line.

10 Claims, 7 Drawing Sheets

(51) Int. Cl.
*G08G 1/16* (2006.01)
*G06T 11/60* (2006.01)

(56) References Cited

FOREIGN PATENT DOCUMENTS

| JP | 2003323627 A | * | 11/2003 | ................ G06T 7/60 |
| JP | 2005100001 A | | 4/2005 | |
| JP | 2006260358 A | * | 9/2006 | ................ G06T 7/60 |
| JP | 2006260358 A | | 9/2006 | |
| JP | 2008013081 A | | 1/2008 | |
| JP | 2008013081 A | * | 1/2008 | ........... B60W 30/10 |
| JP | 2011076248 A | * | 4/2011 | ................ G06T 7/60 |
| JP | 2011076248 A | | 4/2011 | |
| JP | 2013196341 A | | 9/2013 | |

OTHER PUBLICATIONS

International Search Report (in Japanese with English Translation) for PCT/JP2013/061923, mailed Jun. 4, 2013; ISA/JP.
Written Opinion for PCT/JP2013/061923, mailed Jun. 4, 2013; ISA/JP.
International Preliminary Report on Patentability for PCT/JP2013/061923, mailed Nov. 6, 2014 (in Japanese w/ English translation).

* cited by examiner

10 (BLURRING IS ADDED)  20  20  10 (BLURRING IS ADDED)

FIG.11

CONVENTIONAL EXAMPLE  10-1  10-2  20

CRUISING ZONE DIVISION LINE RECOGNITION APPARATUS

CROSS REFERENCE TO RELATED APPLICATIONS

This application is a U.S. National Phase Application under 35 U.S.C. 371 of International Application No. PCT/JP2013/061923 filed on Apr. 23, 2013 and published in Japanese as WO 2013/161817 A1 on Oct. 31, 2013. This application is based on and claims the benefit of priority from Japanese Patent Application No. 2012-101582 filed Apr. 26, 2012. The entire disclosures of all of the above applications are incorporated herein by reference.

TECHNICAL FIELD

The present invention relates to a cruising zone division line recognition apparatus that recognizes a cruising zone division line on a road surface.

BACKGROUND ART

A cruising zone division line recognition apparatus that recognizes a cruising zone division line (such as a white line) on a road is known. The cruising zone division line recognition apparatus acquires an image of a vehicle periphery from an on-board camera. The cruising zone division line recognition apparatus then uses an image recognition technique to recognize a cruising zone division line from the image. The recognized cruising zone division line can be used by a driving assistance system, such as a vehicle lane deviation warning system or a lane keep assist system. An intermittent double line is a type of cruising zone division line. To stably recognize the intermittent double line, a technology is proposed in which pattern determination is performed (refer to PTL 1).

CITATION LIST

Patent Literature

[PTL 1] JP-A-2003-178399

SUMMARY OF INVENTION

Technical Problem

Figure 11:
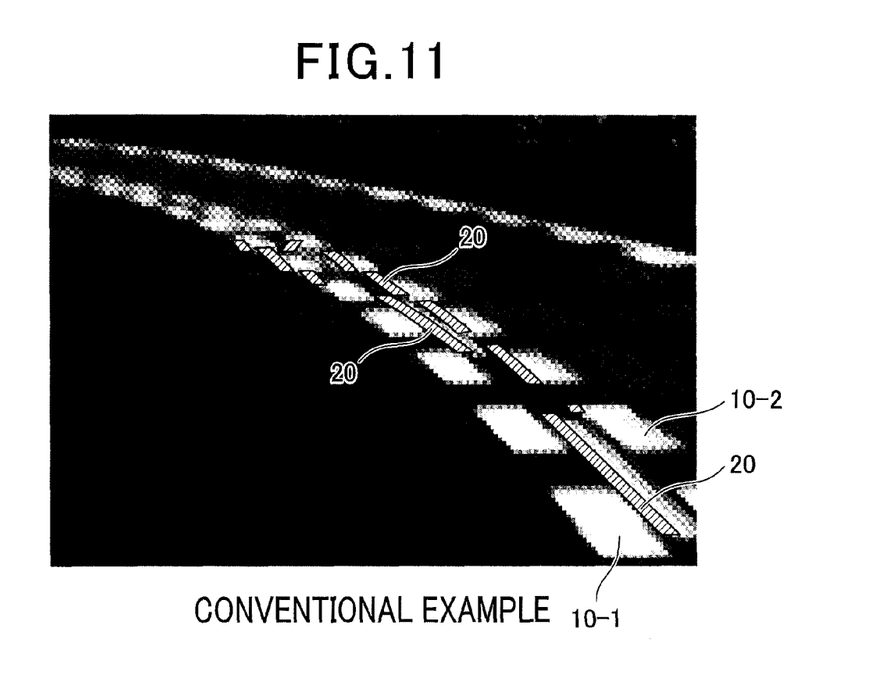
FIG. 11 is an image of the result of recognition of an intermittent double line from a road surface image when blurring is not added (conventional example).

When the cruising zone division line is, for example, the intermittent double line (10-1 and 10-2) shown in FIG. 11, the following problem occurs when the cruising zone division line recognition apparatus attempts to recognize the intermittent double line. In other words, when the cruising zone division line recognition apparatus attempts to recognize the intermittent double line (10-1 and 10-2), for example, as shown in FIG. 11, the intermittent line (10-1) on the inner side and the intermittent line (10-2) on the outer side are both recognition subjects. Therefore, the recognition result is a discontinuous, disjointed line 20 indicated by shaded rectangles in FIG. 11. When driving assistance is performed using a recognition result such as this, driving may be hindered. The present invention has been achieved in light of such issues. An object of the present invention is to provide a cruising zone division line recognition apparatus that is capable of solving the above-described problem.

Solution to Problem

To solve the above-described problem, the present application provides, as a typical example, a cruising zone division line recognition apparatus that includes: an image acquisition device that acquires an image including a road surface ahead of a vehicle; and an image processing device that has an image processing function for adding blurring to an area including the road surface in the image acquired by the image acquisition apparatus, and a cruising zone division line recognition function for recognizing a cruising zone division line from the image to which blurring has been added.

The cruising zone division line recognition apparatus of the typical example recognizes the cruising zone division line using an image after blurring has been added. In the image after blurring has been added, even when the cruising zone division line is an intermittent double line, the overall cruising zone division line is a single thick line. Therefore, the recognized cruising zone division line does not become a discontinuous, disjointed line.

DESCRIPTION OF EMBODIMENTS

An embodiment of the present invention will be described.

1. Configuration of a Cruising Zone Division Line Recognition Apparatus 1

Figure 1:
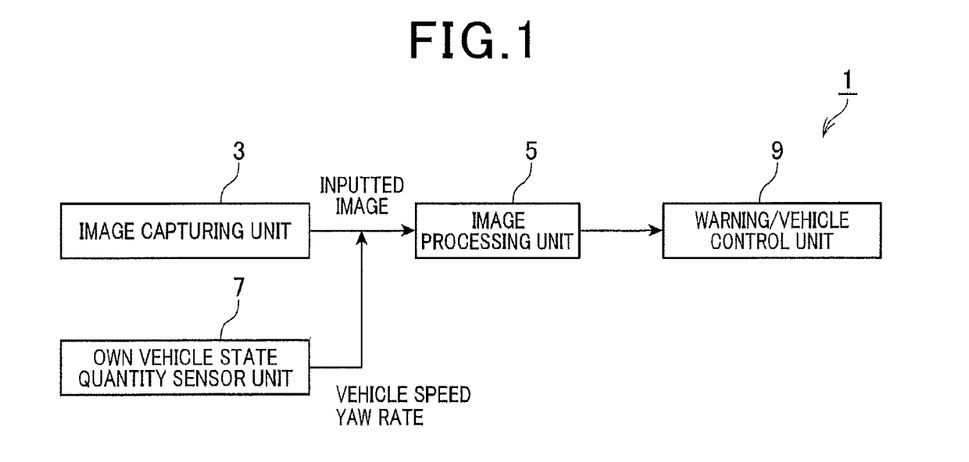
FIG. 1 is a block diagram of a configuration of a cruising zone division line recognition apparatus.
Figures 2A, 2B:
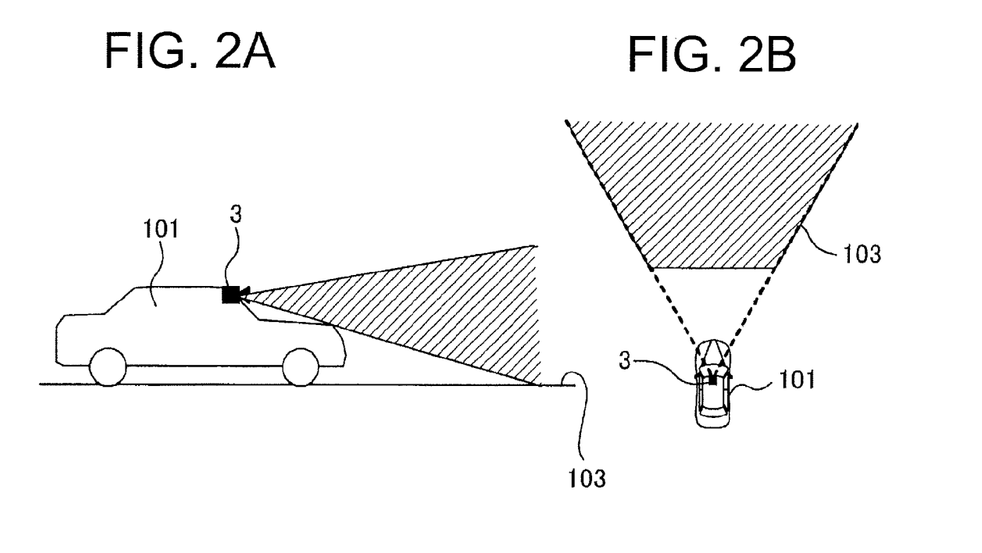
FIG. 2A is a side view of a mounting position of an image capturing unit.
FIG. 2B is a planar view of a mounting position of an image capturing unit.

A configuration of a cruising zone division line recognition apparatus 1 will be described with reference to FIG. 1, FIG. 2A, and FIG. 2B. The cruising zone division line recognition apparatus 1 is an on-board device that is mounted in a vehicle. The cruising zone division line recognition apparatus 1 includes an image capturing unit 3 (an "image acquisition device" in claims), an image processing unit 5 (an "image processing device" in claims), an own vehicle state quantity sensor unit 7, and a warning/vehicle control unit 9. The image capturing unit 3 acquires an image (referred to, hereinafter, as a road surface image) including a road surface that is ahead of the vehicle. The image processing unit 3 performs image processing on the road surface image acquired by the image capturing unit 3 and recognizes a cruising zone division line (such as a white line). The own vehicle state quantity sensor unit 7 detects the cruising speed and the yaw rate of the vehicle.

The image capturing unit 3 is a camera, such as a charge-coupled device (CCD) camera, a camera that uses a camera tube, or an infrared camera that is capable of capturing infrared images. As shown in FIG. 2A and FIG. 2B, the image capturing unit 3 is mounted on the center front side of a vehicle 101. The image capturing unit 3 repeatedly captures images at a predetermined interval (every 0.1 seconds in the present example). The captured image (referred to, hereinafter as a road surface image 105) includes a road surface 103 ahead of the vehicle 101. Information on the road surface image 105 captured by the image capturing unit 3 is outputted to the image processing unit 5.

The image processing unit 5 is a known microcomputer that is composed of a central processing unit (CPU) (processor), a read-only memory (ROM), a random access memory (RAM), an input/output (I/O), a bus, and the like. The bus connects the CPU, the ROM, the RAM, and the I/O.

The warning/vehicle control unit 9 performs operations for driving assistance based on the cruising zone division line recognized by the image processing unit 5, and the cruising speed and yaw rate detected by the own vehicle state quantity sensor unit 7. Specifically, the warning/vehicle control unit 9 performs cruising lane deviation warning based on the cruising zone division line. The cruising lane deviation warning is control performed to issue a warning to the driver when the distances in the lateral direction from the vehicle to the cruising zone division lines on the left and right are calculated, and either distance is a threshold or less. In other words, the warning is issued when the vehicle becomes closer to the cruising zone division line than a distance set by the threshold.

In addition, the warning/vehicle control unit 9 performs steering assistance control and collision warning based on the cruising zone division line. The steering assistance control is control performed to assist steering operation based on the cruising lane in the cruising direction of the vehicle. The collision warning is control performed to issue a warning to the driver when the distance to another vehicle ahead of the vehicle in the same cruising lane becomes close.

2. Processes Performed by the Cruising Zone Division Line Recognition Apparatus 1

Processes performed by the cruising zone division line recognition apparatus 1 will be described with reference to FIG. 3 to FIG. 9. The cruising zone division line recognition apparatus 1 repeatedly performs the process shown in the flowchart in FIG. 3 while power is being supplied (while the ignition of the vehicle is turned ON).

Figure 3:
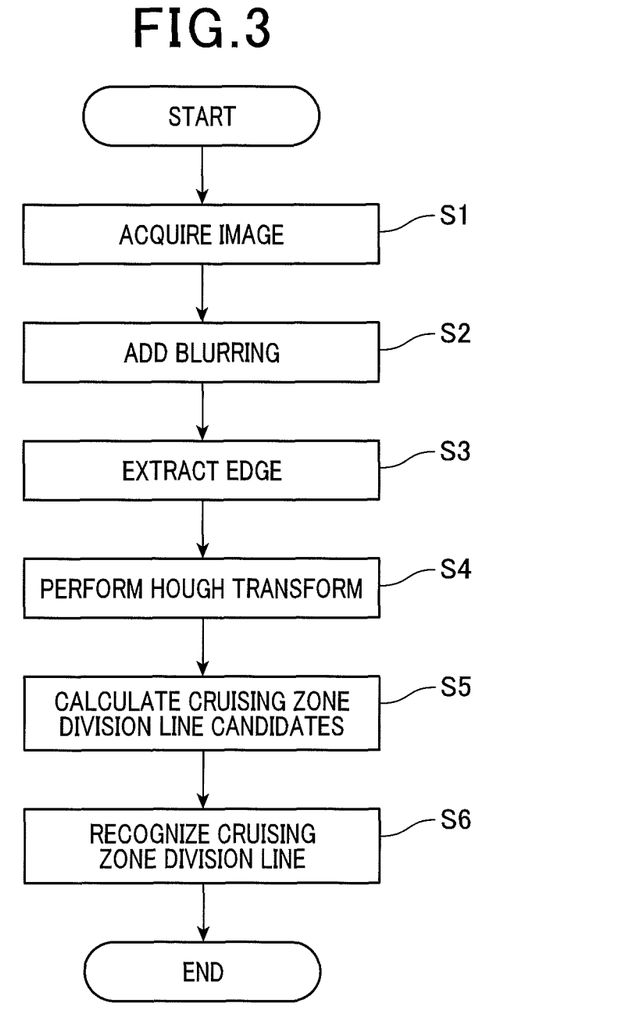
FIG. 3 is a flowchart of a cruising zone division line recognition process performed by the cruising zone division line recognition apparatus.
Figure 4:
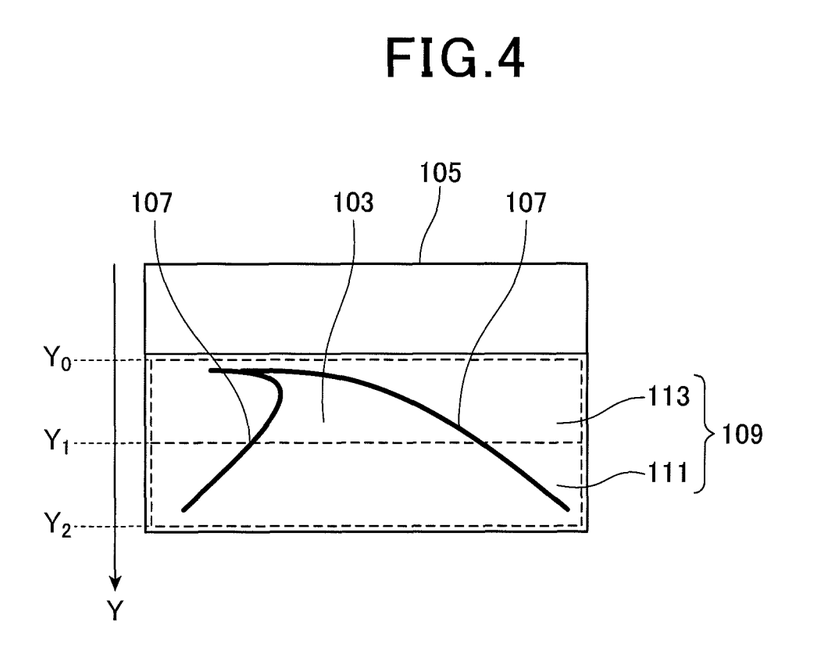
FIG. 4 is an explanatory diagram of a road surface image.

At step S1 in FIG. 3, the image capturing unit 3 acquires a road surface image 105. As shown in FIG. 4, the road surface image 105 includes the road surface 103 ahead of the vehicle. When a cruising zone division line 107 is present on the road surface 103, the cruising zone division line 107 is also included in the road surface image 105. The road surface image 105 is outputted to the image processing unit 5.

The Y coordinates shown in FIG. 4 are coordinates in the direction from top (far) to bottom (near the vehicle) in the road surface image 105. In the road surface image 105, an area 109 of which the Y coordinates are $Y_0$ to $Y_2$ is an area indicating the road surface 103. An area 111 of which the Y coordinates are $Y_1$ to $Y_2$ is a predetermined road surface area of the road surface 103 that is near the vehicle. An area 113 of which the Y coordinates are $Y_0$ to $Y_1$ is a road surface area of the road surface 103 that is farther than the area 111. The attachment position, the attachment angle, and the width of the imaging area of the image capturing unit 3 are fixed. Therefore, the area 109 in which the road surface 103 is displayed in the road surface image 105 is substantially fixed.

Returning to FIG. 3, at step S2, the image processing unit 5 performs a process for adding blurring to the area 109 in the road surface image 105 acquired at above-described step S1. The road surface 103 is displayed in the area 109. The process for adding blurring is a process for obscuring (making unclear) a boundary line of an object (such as a cruising zone division line) displayed in an image. As an example of the process for adding blurring, an averaging process can be given.

Figure 5:
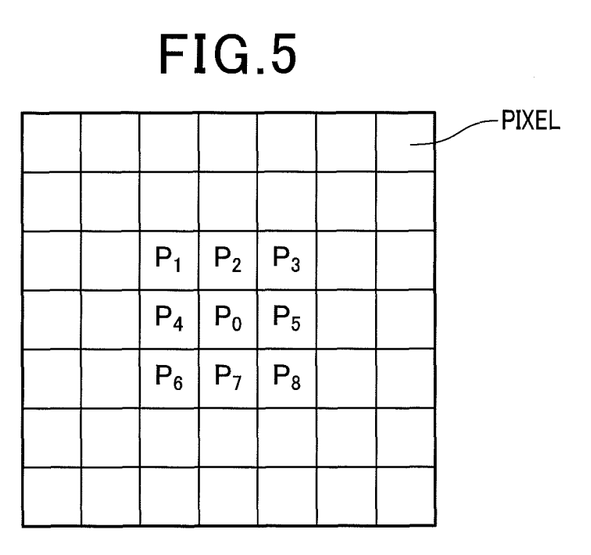
FIG. 5 is an explanatory diagram of an averaging process.
Figure 6:
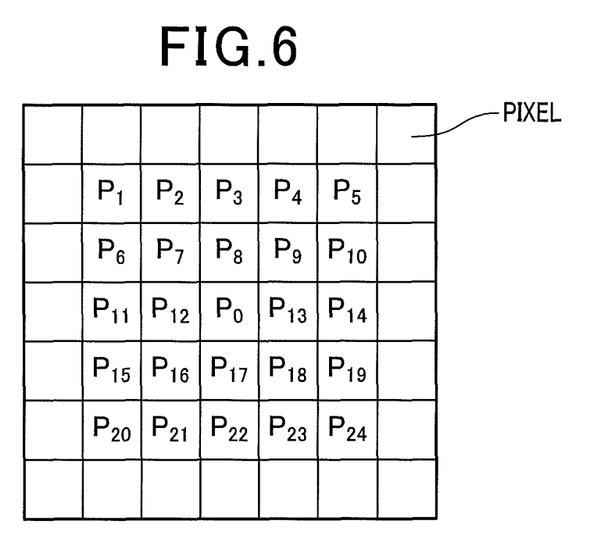
FIG. 6 is an explanatory diagram of an averaging process.

The averaging process will be described with reference to FIG. 5. Each rectangular block in FIG. 5 indicates a single pixel in the road surface image 105. In the averaging process, for example, the luminance of a pixel $P_0$ is converted to an average value of the luminance of the pixel $P_0$ and the surrounding pixels $P_1$ to $P_8$. A similar process is performed on each pixel belonging to the area 109. The range of pixels (number of pixels) to be averaged in the averaging process is not limited to that shown in FIG. 5 and can be arbitrarily set. For example, as shown in FIG. 6, the luminance of the pixel $P_0$ can be converted to the average value of the luminance of the pixel $P_0$ and the surrounding pixels $P_0$ to $P_{24}$. When averaging is performed, the weight of each pixel can be arbitrarily set. For example, in the example shown in FIG. 6, when determining the luminance of the pixel $P_0$, the weights of proximal pixels $P_0$, $P_7$, $P_8$, $P_9$, $P_{12}$, $P_{13}$, $P_{16}$, $P_{17}$, and $P_{18}$ can be made large. The weights of the other pixels can be made small. Alternatively, the weights of all pixels may be uniform. The averaging process can be performed using a dedicated filter.

In the averaging process, the blurring to be added increases as the range of pixels to be averaged widens. In other words, the image after processing becomes more obscure or unclear. For example, the blurring to be added increases when the luminance of the pixel $P_0$ is converted to the average value of the luminance of the pixel $P_0$ and the surrounding pixels $P_1$ to $P_{24}$, compared to when the luminance of the pixel $P_0$ is converted to the average value of the luminance of the pixel $P_0$ and the surrounding pixels $P_1$ to $P_8$ as shown in FIG. 5.

Figure 7:
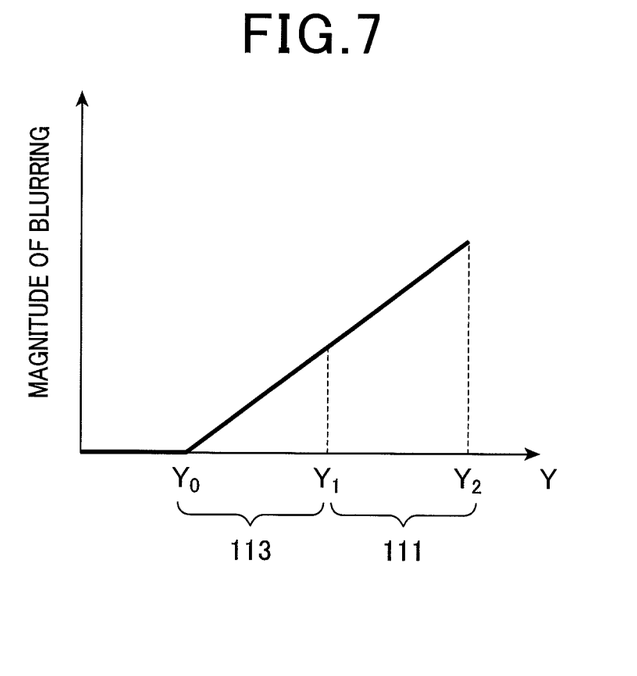
FIG. 7 is a graph of a relationship between Y coordinates and the magnitude of blurring to be added in a road surface image.

At step S2, the above-described averaging process is performed on each pixel within the range 109 in which the road surface 103 is displayed in the road surface image 105. Blurring is thereby added to the road surface image 105. At this time, the degree of blurring to be added (in other words, the range of pixels to be averaged in the averaging process) is set to a value that differs depending on the position of the Y coordinate of each pixel. More specifically, as shown in FIG. 7, the blurring to be added is minimal when the position of the Y coordinate is $Y_0$. The blurring to be added gradually increases towards $Y_2$.

In other words, in the road surface image 105, more blurring is added to the predetermined road surface area 111 near the vehicle compared to the road surface area 113 that is farther than the predetermined road surface area 111. In addition, the amount of blurring to be added increases towards the vehicle.

In the road surface image 105 after the averaging process, the magnitude of blurring is a sum (referred to, hereinafter, as the total sum of blurring) of the magnitude of blurring determined by the characteristics (particularly the lens characteristics) of the image capturing unit 3 and the magnitude of blurring added by the averaging process. In the road surface image 105 after the averaging process, the amount of blurring to be added is set for each of the predetermined road surface area 111 near the vehicle and the road surface area 113 that is farther than the predetermined road surface area 111 so that the total sum of blurring is fixed at all times.

At step S3, the image processing unit 5 performs an edge extraction process on the road surface image 105 to which blurring has been added at above-described step S2. The edge extraction process is a known type of image processing. The image processing unit 5 thereby extracts edge points. At step S4, the image processing unit 5 performs Hough transform on the edge points extracted at above-described step S3 and detects straight lines.

At step S5, the image processing unit 5 calculates a straight line that has a large number of Hough transform votes, among the straight lines detected at above-described step S4, to be a cruising zone division line candidate.

At step S6, the image processing unit 5 culls the cruising zone division line candidates. Specifically, for example, the image processing unit 5 restricts the cruising zone division line candidates to those of which the ratio of contrast of the cruising zone division line candidate to the surrounding road surface is higher than a predetermined threshold. Alternatively, the image processing unit 5 restricts the cruising zone division line candidates to those of which the difference in luminance between the cruising zone division line candidate portion and the surrounding luminance is a predetermined threshold or greater. In addition, culling may be performed by taking into consideration various features, such as line thickness or total extension distance. Then, the image processing unit 5 selects a single cruising zone division line candidate that is the closest in each of the left and right directions from the center of the vehicle. The image processing unit 5 recognizes the selected cruising zone division line candidates as the left and right cruising zone division lines. The image processing unit 5 then outputs the recognized left and right cruising zone division lines to the warning/vehicle control unit 9.

3. Effects Achieved by the Cruising Zone Division Line Recognition Apparatus 1

Figure 10:
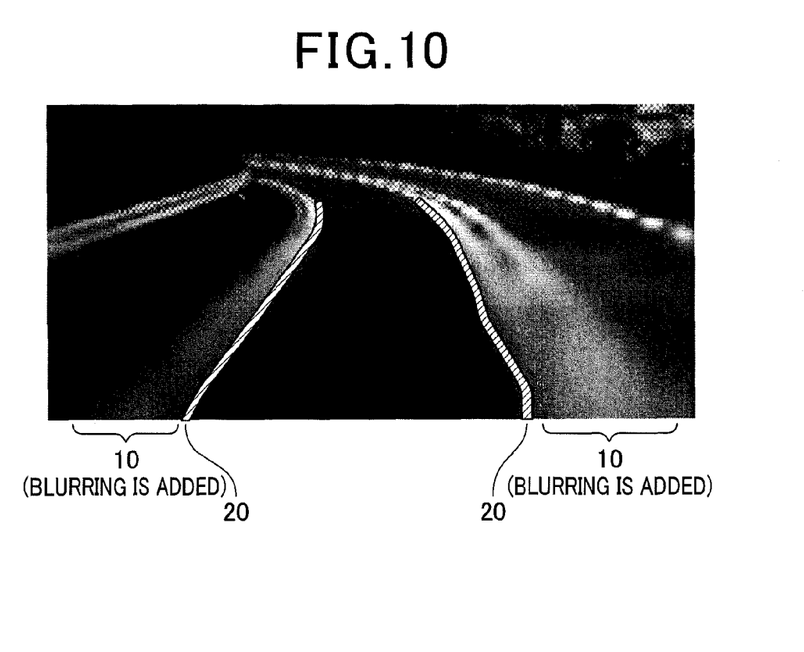
FIG. 10 is an image of the result of recognition of an intermittent double line from a road surface image after blurring is added.

(1) The cruising zone division line recognition apparatus 1 adds blurring to the road surface image 105. The cruising zone division line recognition apparatus 1 then recognizes the cruising zone division line using the road surface image 105 after the blurring has been added. For example, in the road surface image 105 after the blurring has been added, even when the cruising zone division line is an intermittent double line as shown in FIG. 10, the overall cruising zone division line appears to be a single thick line. Therefore, the recognized cruising zone division line 20 does not become a discontinuous, disjointed line.

(2) The cruising zone division line recognition apparatus 1 adds a larger blurring to the predetermined road surface area 111 than the road surface area 113 that is farther than the road surface area 111 in the road surface image 105. In addition, the magnitude of the blurring to be added increases towards the vehicle. As a result, a single continuous cruising zone division line can be recognized in the predetermined road surface area 111 near the vehicle in which problems such as that shown in FIG. 11 easily occur. In addition, the amount of blurring to be added does not become too large in the distal road surface area 113. Therefore, recognition of the cruising zone division line in the area 113 is not hindered.

(3) In the road surface image 105 after the averaging process, the total sum of blurring is fixed at all times for the predetermined road surface area 11 near the vehicle and the road surface area 113 that is farther than the predetermined road surface area 111. Therefore, the cruising zone division line can be recognized under the same conditions at all times throughout the overall area 111 and area 113.

Figure 8:
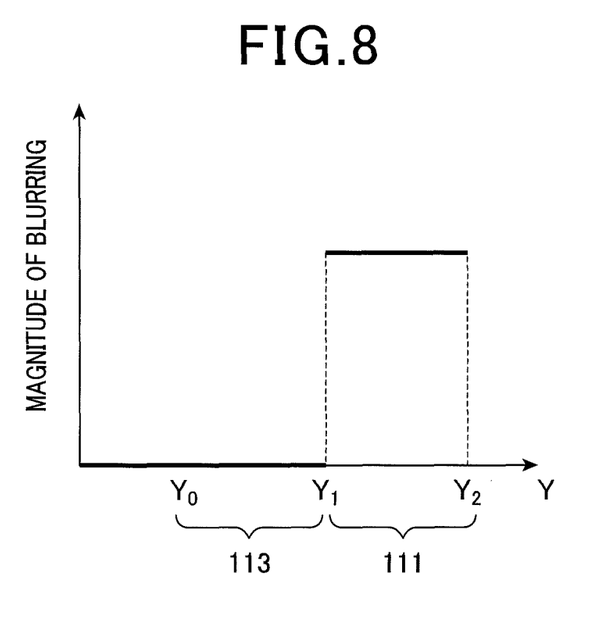
FIG. 8 is a graph of a relationship between Y coordinates and the magnitude of blurring to be added in a road surface image.
Figure 9:
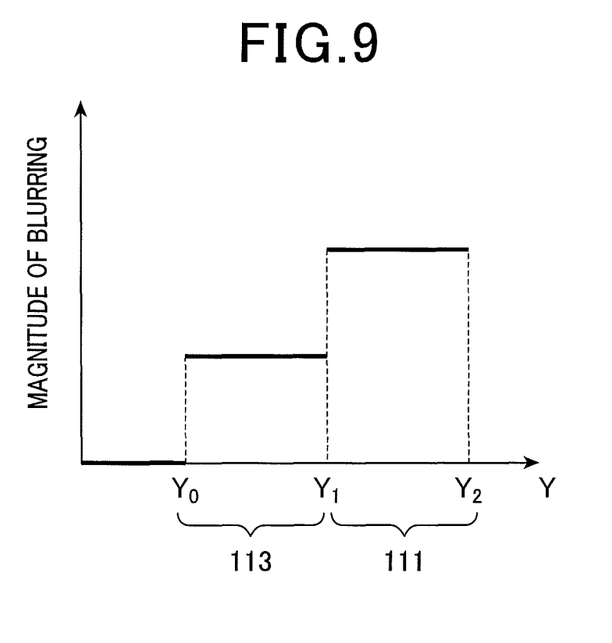
FIG. 9 is a graph of a relationship between Y coordinates and the magnitude of blurring to be added in a road surface image.

4. Other Embodiments (1) A relationship between the magnitude of the blurring to be added (the range of pixels, or in other words, the number of pixels to be averaged in the averaging process) and the position of the Y coordinate of each pixel may be a relationship prescribed in the graph in FIG. 8 or the graph in FIG. 9. The graph in FIG. 8 shows an instance in which blurring of a fixed magnitude is selectively added to only the predetermined road surface area 111 near the vehicle. "Selectively" refers to adding blurring only in instances such as when the vehicle encounters a cruising zone division line that is an intermittent double line. In this case as well, the intermittent double line recognized in the predetermined road surface area 111 near the vehicle can be prevented from becoming a discontinuous, disjointed line. The graph in FIG. 9 shows an instance in which blurring of a predetermined magnitude is added to the distal road surface area 113. Greater blurring is added to the predetermined road surface area 11 near the vehicle. In this case as well, the intermittent double line recognized in the area 111 and the area 113 can be prevented from becoming a discontinuous, disjointed line (2) The cruising zone division line recognition apparatus 1 is not necessarily required to include the warning/vehicle control unit 9. In this instance, information on the cruising zone division line recognized by the image capturing unit 5 can be outputted externally (to another apparatus that is mounted in the vehicle or an apparatus outside the vehicle).

(3) As the process for adding blurring, processes other than the averaging process can be selected as appropriate. For example, a method in which image resolution is reduced can be used.

(4) At above-described step S2, blurring may be added to the overall road surface image 105 including an area even farther than the distal road surface area 113. In this instance, the amount of blurring to be added may increase towards the vehicle or may be uniform.

(5) At above-described step S2, the averaging process may be performed using a filter that integrates the filter for the averaging process and a filter for another purpose (such as a filter for enhancing edges).

REFERENCE SIGNS LIST

1: cruising zone division line recognition apparatus
3: image capturing unit
5: image processing unit
7: own vehicle state quantity sensor unit
9: warning/vehicle control unit
10 (10-1, 10-2): intermittent double-line cruising zone division line
20: recognition result from image processing device
101: vehicle
103: road surface
105: road surface image
107: cruising zone division line

What is claimed is:

1. A cruising zone division line recognition apparatus comprising:
an image acquisition device that acquires an image including a road surface ahead of a vehicle; and
an image processing device that adds blurring to an area including the road surface in the image acquired by the image acquisition device, and recognizes a cruising zone division line from the image to which blurring has been added, wherein:

the image processing device adds, to the area including the road surface, a larger degree of blurring in the area including the road surface as the area becomes closer to the vehicle and a smaller degree of blurring as the area becomes farther from the vehicle; and the image processing device sets an amount of blurring to be added for each of a predetermined road surface area near the vehicle and a road surface area that is farther than the predetermined road surface area so that a total sum of blurring is fixed at all times.

2. The cruising zone division line recognition apparatus according to claim 1, wherein:

the image processing device selectively adds blurring to a predetermined road surface area near the vehicle in the image acquired by the image acquisition device.

3. The cruising zone division line recognition apparatus according to claim 1, wherein:

the image processing device adds greater blurring to a predetermined road surface area near the vehicle compared to a road surface area farther than the predetermined road surface area in the image acquired by the image acquisition device.

4. The cruising zone division line recognition apparatus according to claim 1, wherein:

the image processing device adds blurring to an overall image acquired by the image acquisition device.

5. The cruising zone division line recognition apparatus according to claim 4, wherein:

an amount of blurring to be added increases towards the vehicle.

6. A cruising zone division line recognition method comprising:

a step of acquiring an image including a road surface ahead of a vehicle;

a step of adding blurring to an area including the road surface in the acquired image; and a step of recognizing a cruising zone division line from the image to which blurring has been added, wherein:

the step of adding blurring adds, to the area including the road surface, a larger degree of blurring in the area including the road surface as the area becomes closer to the vehicle and adds a smaller degree of blurring as the area becomes farther from the vehicle; and the step of adding blurring sets an amount of blurring to be added for each of a predetermined road surface area near the vehicle and a road surface area that is farther than the predetermined road surface area so that a total sum of blurring is fixed at all times.

7. The cruising zone division line recognition method according to claim 6, further comprising:

selectively adding blurring to a predetermined road surface area near the vehicle in the image acquired at the image acquisition step.

8. The cruising zone division line recognition method according to claim 6, further comprising:

adding greater blurring to a predetermined road surface area near the vehicle compared to a road surface area farther than the predetermined road surface area in the image acquired at the image acquisition step.

9. The cruising zone division line recognition method according to claim 6, further comprising:

adding blurring to an overall image acquired at the image acquisition step.

10. The cruising zone division line recognition method according to claim 9, wherein:

an amount of blurring to be added increases towards the vehicle.

* * * * *